United States Patent [19]
Vonasek
[11] Patent Number: 4,905,019
[45] Date of Patent: Feb. 27, 1990

[54] PRESSURIZED FLUID PRINTER ARRANGEMENT HAVING TRANSIENT FLUID PRESSURE DROP BUFFERING MEANS

[75] Inventor: Jiri Vonasek, Kungälv, Sweden
[73] Assignee: Markpoint System AB, Goteborg, Sweden

[21] Appl. No.: 216,271
[22] Filed: Jul. 8, 1988
[30] Foreign Application Priority Data
Jul. 13, 1987 [SE] Sweden .......... 8702846-0
[51] Int. Cl.⁴ .......... G01D 15/16; B41J 3/04
[52] U.S. Cl. .......... 346/75; 138/30; 346/140 R; 417/540
[58] Field of Search .......... 346/140, 75; 417/540, 417/543; 138/30

[56] References Cited

U.S. PATENT DOCUMENTS 3,746,120 7/1973 Stemme .......... 346/75
3,761,953 9/1973 Helgeson .......... 346/75
4,124,853 11/1978 Kattner et al. .......... 346/140
4,347,524 8/1982 Engle .......... 346/140
4,514,151 4/1985 Anders .......... 138/30 X
4,576,111 3/1986 Slomianny .......... 346/140 X
4,736,774 4/1988 Vonasek .......... 137/883
4,737,802 4/1988 Mielke .......... 346/140

FOREIGN PATENT DOCUMENTS 72166929 11/1975 Sweden .

*Primary Examiner*—Joseph W. Hartary
*Attorney, Agent, or Firm*—Fleit, Jacobson, Cohn, Price, Holman & Stern

[57] ABSTRACT

Device for printers using pressurized fluid medium for recording characters on an information carrier. The device is formed with at least one buffer chamber placed in direct connection with a fluid chamber, which constitutes one side of a wall or plate provided with a discharge. The buffer chamber includes an elastic or at least flexible dividing wall between the fluid chamber and the buffer chamber. The buffer chamber has a relatively small volume and is closed and, in one embodiment, is such that it allows penetration or migration of gas molecules only through the dividing wall.

10 Claims, 3 Drawing Sheets

FIG. 1
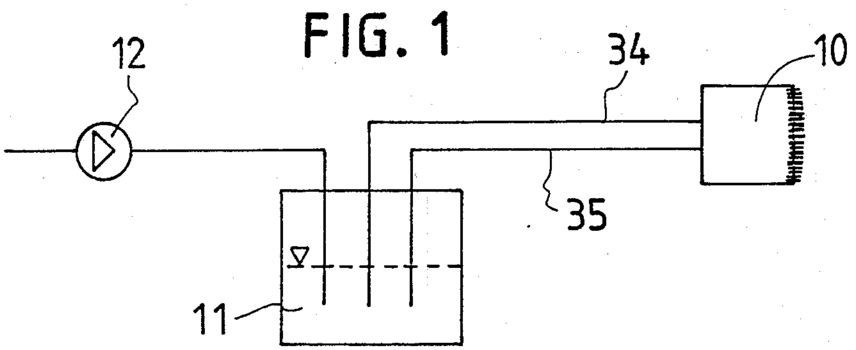
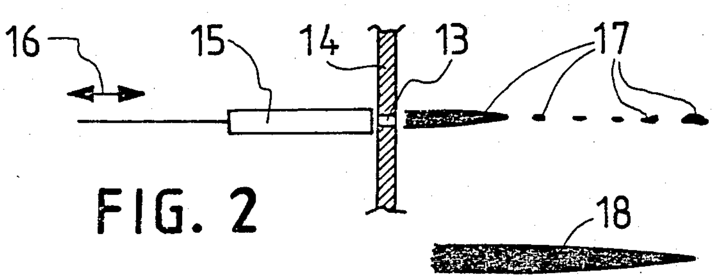
FIG. 2
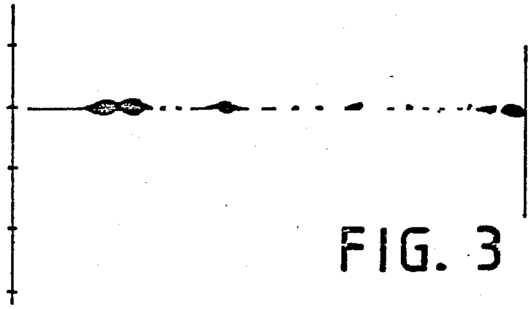
FIG. 3
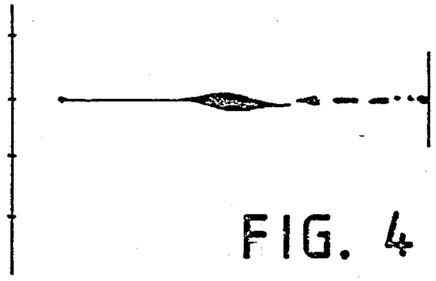
FIG. 4

PRESSURIZED FLUID PRINTER ARRANGEMENT HAVING TRANSIENT FLUID PRESSURE DROP BUFFERING MEANS

FIELD OF THE INVENTION

The invention relates to a device for printers using a pressurized fluid medium for recording characters on an information carrier comprising, adjacent to discharge openings for the fluid medium, a chamber, provided for the medium, and arrangements for controlling the opening and closing of the openings in a predetermined manner.

In particular it relates to a device for printers of the type often referred to as ink-jet printers, where the term "ink" is naturally given a broad interpretation but where the principle of printing is based on the use of a pressurized fluid, under controlled forms, being discharged through small openings in a printer head. Such openings may for example be arranged in a row in a printer head which has a fixed orientation, or which is rotatable about an axis which is perpendicular to the plane of the openings.

It is here a question of relatively fast opening and closing processes in the valve arrangements which are used. In this connection it is unavoidable that transient pressure phenomena arise. The transient drops in pressure which arise at the discharge openings at the precise moment that the valve opens constitute a troublesome transient phenomenon from the point of view of recording.

DESCRIPTION OF THE RELATED ART

When it comes to reducing pressure fluctuations it is known to use a multi-chamber system for the pressurized medium. A system having double chambers is shown e.g. in the Swedish publication 7216692-9. This multi-chamber system is a so-called capillary system, in which the fluid communicates directly through the capillaries with the surrounding atmosphere. Since fluids of the type under discussion usually include a solvent which makes the fluid managable it will be appreciated that capillaries involve obvious difficulties in such systems.

Another multi-chamber system is shown in the Swedish publication 8406552-3. In this case use is made of the possibility of providing what is called an impulsive rise of pressure in a second chamber by means of a dividing wall which can "bulge" into the second chamber in an attempt to increase the efficiency of drop production.

SUMMARY OF THE INVENTION

The object of the invention is to provide a system which is significantly simpler than the known systems and whose primary function is to reduce the pressure drop in the discharge openings for the fluid so that full use can be made of the drop-forming ability of the pressurized fluid without regard for the transients which otherwise normally arise.

In principle the invention bears a certain resemblance to hydraulic suspension systems in motor vehicles, but the novel in the invention is found in the fact that one is able to effectively eliminate transients of short duration which arise at the high opening and closing frequencies found in connection with the invention.

It has been realized that some kind of buffer arrangement is required in the hydraulic system which, in principle, is formed by the pressurized fluid. The correct placement of such buffer arrangements, i.e., as close as possible to the transient source, has also been determined.

The invention thus provides a device for printers using a pressurized fluid medium for recording characters on an information carrier comprising, adjacent to discharge openings for the fluid medium, a chamber, provided for the medium, and arrangements for controlling the opening and closing of the openings in a predetermined manner.

Characteristic for the device is that at least one buffer chamber for absorbing transient pressure changes is arranged near the discharge openings.

In a preferred embodiment the buffer chamber comprises an elastic or at least flexible dividing wall between the fluid chamber and the buffer chamber.

In order to be, in principle, independent of penetration by molecules of the solvent or the like out to the environment the buffer chamber is preferably made as a closed chamber with such characteristics that it allows penetration or migration of gas molecules only through the membrane.

In a particular embodiment the fluid chamber is formed between a valve housing and a covering plate, which is provided with an opening, against which closeable and openable valve bodies act, in which these bodies, or members cooperating with them, are guided in guide holes in the valve housing. Characteristic of this arrangement is that the said buffer chamber(s) is (are) arranged directly adjacent to the said guide holes in the valve housing.

In yet another embodiment the buffer chamber is provided with a bore having an opening in communication with the fluid chamber, and a body inserted into the bore.

The bore communicates preferably with the chamber via an opening which is smaller than the bore.

In a practical embodiment the dividing wall is inserted between the valve body and the opening.

A cavity, against which the membrane acts during the transient pressure processes, is preferably arranged between the bore and the dividing wall.

In a practical embodiment the body is made slightly conical and is intended to be received in the bore with a press fit.

A through passage is preferably made in the body. During insertion of the body in the bore, the through passage communicates with the side of the membrane facing away from the fluid, and it is arranged to be sealed by means of a sealing element after the body is put in its intended place.

BRIEF DESCRIPTION OF THE DRAWINGS

The invention will now be exemplified with reference to the accompanying drawings, in which:

FIG. 1 schematically shows a fluid system for the device according to the invention;

FIG. 2 shows a deficient type of drop formation which can arise in known systems;

FIG. 3 shows the same deficiency, but in the form of a photographic image;

FIG. 4 shows an acceptable drop forming function achieved in accordance with the invention;

DESCRIPTION OF THE PREFERRED EMBODIMENT

Figure 5:
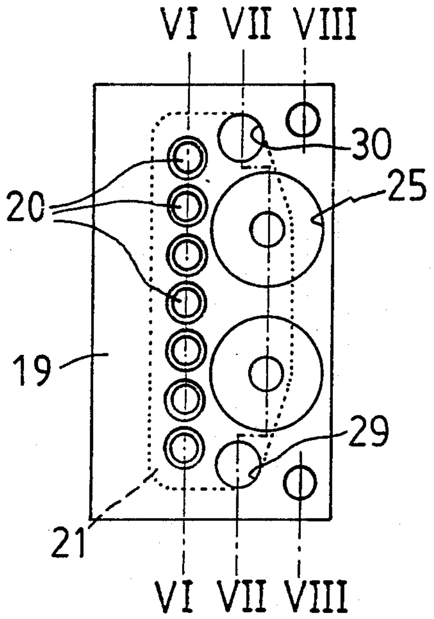
FIG. 5 shows a front view of a valve housing for a printer head according to the invention.
Figure 6:
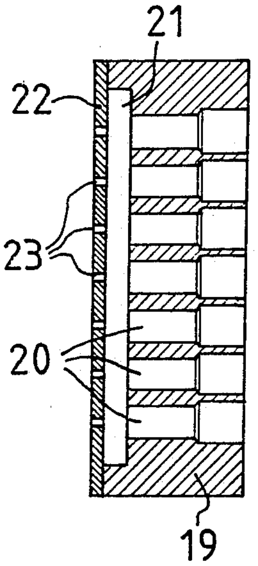
FIG. 6 is a section along the line VI—VI in FIG. 5.

The printer head 10 in FIG. 1 is supplied with printing fluid from a reservoir 11, which, by means of a pump 12, is pressurized to a given predetermined pressure, e.g., 1.3 atmospheres.

FIG. 2 shows in a simplified manner what can happen at a discharge opening 13 in the printer head 10. To the left of the plate 14 in FIG. 2 the presssure is normally determined by the fluid from the reservoir 11. However, when a valve body 15, which is maneuverable in the direction of the double arrow 16, is opened, a certain brief pressure drop arises in the opening 13, which can lead to unsatisfactory drop formation such as is shown and designated by the reference numeral 17. What is desired is in fact a drop formation according to 18, i.e., one single elongated unbroken jet.

There are of course other ways of pressurizing the printing fluid besides that which is shown in FIG. 1. Instead of the circulating system comprising lines 34 and 35 one could for example have a system with only one supply line and some form of overload valve on the return side. Circulating systems are, however, the pressurization systems which are usually preferred.

FIG. 3 depicts a photographic picture taken by means of a high speed camera in connection with a printer head of the type shown in FIG. 2, i.e., without any kind of buffer arrangement.

In contrast, FIG. 4 shows the results obtained by means of the buffer chamber arrangement which will now be described.

FIG. 5 is a front view of a valve housing 19, in which is formed a set of seven guide openings 20 for the valve arrangement, for example of the type shown in our Swedish patent application No. 8605348-5.

As is seen in FIG. 5, a fluid chamber 21 is located in front of these guide openings (belonging to valve anchors and guides which are not shown). This chamber is in front terminated by means of a covering plate 22 which, normally, is glued directly onto the valve housing 19. In the plate 22 are seven discharge openings 23 for the fluid in the system. Control of the opening and closing sequences of these openings can e.g. proceed according to the said Swedish patent application, i.e., by means of electromagnetically maneuvered valve anchors. That which characterizes the system is that the anchor ends (compare with the element 15 in FIG. 2) act directly against the corresponding discharge openings 23 and in the fluid chamber 21, which forms the fluid reservoir.

Figure 7:
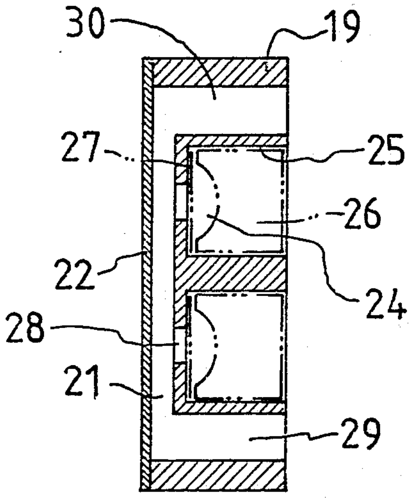
FIG. 7 is a section along the line VII—VII in FIG. 5.

In order to overcome transient phenomena—foremost the pressure drop caused during the initial phase as shown in FIG. 2—according to the invention, the possibility of placing a buffer chamber 24 according to FIG. 7 close or directly connected to these openings 23 has been realized. In the arrangement shown there are two chambers 24, each of which is provided by means of a bore 25 in the valve housing 19 by inserting a slightly conical body 26 as in FIG. 9 into the bore and by inserting a membrane 27 between the front portion of the body and the bottom of the bore. This membrane is elastic, e.g., made of ethylpropylene rubber or butyl rubber. Alternatively, a membrane is conceivable which is perhaps not elastic in the proper sense of the term, but which is flexible in such a way that it changes the volume of the chamber under the influence of brief transient pressure processes. Some kind of membrane, maneuverable between two quasi-stable positions by means of "rocker action", is for example conceivable.

In FIG. 7 it is seen that the membrane 27 lies inside of an opening 28 in the bottom of the fluid chamber 21 and that this opening 28 is considerably smaller than the bore 25.

A controlled atmosphere, e.g. air or some suitable gas, is maintained in the chamber 24. Since the chamber(s) 24 represents a limited volume compared with the volume of the fluid system, penetration or migration of gas molecules to the chamber(s) 24 which can arise from the fluid will be minimal before saturation of the gas occurs in the buffer chambers. This means that, by means of the proposed buffer chambers, there is no risk of the fluid drying out or some other such phenomenon.

In FIG. 7 are also shown two passages 29, 30, which are connected with the fluid chamber 21. These passages represent the circulating connection 19, 20 between the printer head and the fluid reservoir as illustrated in FIG. 1.

Figure 9:
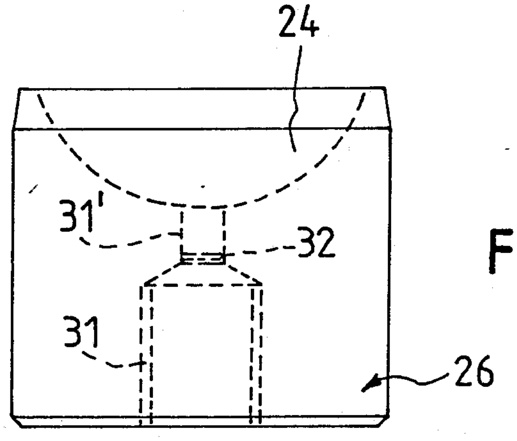
FIG. 9 is a side view of a "plug" for creating a buffer chamber or accumulator according to the invention.
Figure 10:
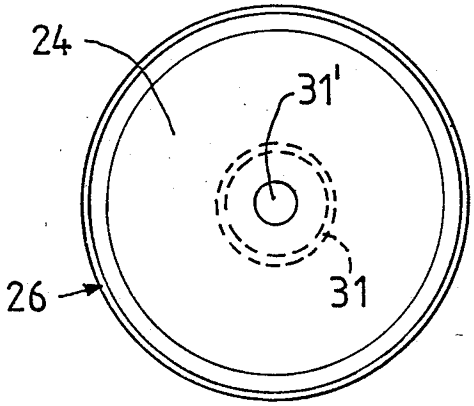
FIG. 10 is a view from above of the "plug" in FIG. 9.

As is seen in FIG. 9, the body 26 is somewhat conical and it is shaped in such a way that it may be inserted into the bore 25 with a press fit. In order to enable this operation and to allow evacuation of air from the chamber 24 which is thus being formed, a through passage 31 is provided in the body 26. In FIG. 9 this terminates above with a narrower passage 31'. When the body 26 is inserted and secured in place in the bore the chamber 24 is sealed by screwing a screw in the passage 31 and by providing it with a suitable sealing ring 32.

Figure 8:
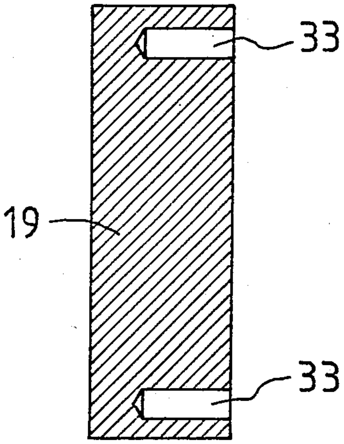
FIG. 8 is a section along the line VIII—VIII in FIG. 5.

FIG. 8 shows a pair of threaded holes 33 whose purpose is to form the securing points for fastening screws for the solenoid package (not shown) which controls the valves (also not shown) which are to open and close the passages 23 in the plate 22.

Although a specific embodiment of the invention has been described it will be understood that modifications and alternatives are possible within the scope of the enclosed patent claims.

I claim:

1. In a device for printing using a pressurized fluid medium for recording characters on an information carrier and including a valve housing containing therewithin a fluid chamber for the pressurized fluid medium, discharge openings provided in a wall of the fluid chamber for discharging therethrough the pressurized fluid medium from said fluid chamber, and valve means arranged for controlling the opening and closing of the discharge openings at high opening and closing frequencies in a predetermined manner, the improvement comprising:

at least one buffer chamber means provided within said valve housing closely proximate to and in direct fluid pressure communication with said fluid chamber and said discharge openings thereof for directly absorbing short duration transient pressure changes in said pressurized fluid medium in said fluid chamber and at said discharge openings upon said discharge openings being opened by said valve means.

2. Device according to claim 1, wherein the buffer chamber includes a flexible dividing wall between the fluid chamber and the buffer chamber.

3. Device according to claim 2, wherein the buffer chamber is closed and allows penetration or migration of gas molecules only through the dividing wall.

4. Device according to claim 1, in which the fluid chamber is provided between a valve housing and a covering plate against which openable and closeable valve bodies act and in which these valve bodies and elements cooperating with them are guided in guide holes in the valve housing, wherein the said buffer chamber is provided in the valve housing in close proximity to the said guid holes in the valve housing.

5. Device according to claim 4, wherein the buffer chamber is formd by a bore with a passage arranged in communication with the fluid chamber, and a body inserted in the bore.

6. Device according to claim 5, wherein the bore communicates with the fluid chamber via an opening which is smaller than the bore.

7. Device according to claim 6, wherein the said dividing wall is located between the body and the opening.

8. Device according to claim 7, wherein a cavity, against which the membrane acts during the said transient pressure changes, is defined between the body and the dividing wall.

9. Device according to claim 8, wherein the body is formed as a slightly conical body intended to be received in the bore with a press fit.

10. Device according to claim 9, wherein a through passage is made in the body which, during insertion of the body into the bore, communicates with the side of the membrane facing away from the fluid chamber and which is provided to be sealed by means of a sealing element after the body has been put in its intended place.

* * * * *